United States Patent
Qin et al.

(10) Patent No.: US 11,976,414 B2
(45) Date of Patent: May 7, 2024

(54) POLYSILOXANE-BASED WATER REPELLANTS FOR TEXTILES

(71) Applicant: Dow Silicones Corporation, Midland, MI (US)

(72) Inventors: Shuang Qin, Downingtown, PA (US); Jordan Stracke, Midland, MI (US); Shawn Mealey, Midland, MI (US); Jongwook Choi, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/551,429

(22) PCT Filed: May 6, 2022

(86) PCT No.: PCT/US2022/072147
§ 371 (c)(1),
(2) Date: Sep. 20, 2023

(87) PCT Pub. No.: WO2022/266566
PCT Pub. Date: Dec. 22, 2022

(65) Prior Publication Data
US 2024/0102233 A1    Mar. 28, 2024

Related U.S. Application Data

(60) Provisional application No. 63/210,517, filed on Jun. 15, 2021.

(51) Int. Cl.
| | | |
|---|---|---|
| *D06M 15/643* | (2006.01) | |
| *C08L 83/08* | (2006.01) | |
| *C09D 5/02* | (2006.01) | |
| *C09D 183/08* | (2006.01) | |
| *D06M 13/395* | (2006.01) | |

(52) U.S. Cl.
CPC ......... *D06M 15/6436* (2013.01); *C08L 83/08* (2013.01); *C09D 5/022* (2013.01); *C09D 183/08* (2013.01); *D06M 13/395* (2013.01); *D06M 15/643* (2013.01); *C08L 2201/52* (2013.01); *C08L 2205/025* (2013.01); *D06M 2200/12* (2013.01)

(58) Field of Classification Search
CPC .. D06M 15/6436; D06M 15/653; C08L 83/00
USPC .................................................. 252/8.61–8.63
See application file for complete search history.

(56) References Cited

U.S. PATENT DOCUMENTS

| | | | |
|---|---|---|---|
| 3,436,251 A | 4/1969 | Rees | |
| 4,098,701 A | 7/1978 | Burrill et al. | |
| 4,177,176 A | 12/1979 | Burrill et al. | |
| 5,395,549 A * | 3/1995 | Ozaki ............... | D06M 15/6436 252/8.61 |
| 5,409,620 A | 4/1995 | Kosal et al. | |
| 5,973,068 A | 10/1999 | Yamaya et al. | |
| 7,767,747 B2 | 8/2010 | Lind et al. | |
| 7,998,583 B2 | 8/2011 | Minge et al. | |
| 9,777,105 B2 | 10/2017 | Hamajima et al. | |
| 9,808,413 B2 | 11/2017 | Abe | |
| 10,040,891 B2 | 8/2018 | Hamajima et al. | |
| 10,584,263 B2 | 3/2020 | Pirrung et al. | |
| 2012/0114928 A1* | 5/2012 | Jiang ..................... | C08L 83/06 428/221 |
| 2017/0121535 A1* | 5/2017 | Lehotkay .......... | D06M 15/6436 |
| 2018/0186922 A1 | 7/2018 | Hamajima et al. | |
| 2019/0375897 A1 | 12/2019 | Gotou et al. | |
| 2019/0382581 A1 | 12/2019 | Di Giovanni et al. | |
| 2020/0317906 A1 | 10/2020 | Gernandt et al. | |
| 2020/0332148 A1 | 10/2020 | Gotou et al. | |

FOREIGN PATENT DOCUMENTS

| | | |
|---|---|---|
| EP | 1282656 | 2/2004 |
| JP | 2002146680 | 5/2002 |
| JP | 2004059609 | 2/2004 |
| JP | 2016004565 | 1/2016 |
| JP | 2016030763 | 3/2016 |
| JP | 5947628 | 7/2016 |
| WO | 02081811 | 10/2002 |
| WO | 2019001901 | 1/2019 |

OTHER PUBLICATIONS

Machine translation of JP 2002-146680 (no date).*
Machine translation of JP 2004-059609 (no date).*
"Dowsil™ IE-8749 Emulsion Technical Data Sheet", The Dow Chemical Company, 2020.

* cited by examiner

*Primary Examiner* — Marc S Zimmer
(74) *Attorney, Agent, or Firm* — Edward W. Black

(57) ABSTRACT

An aqueous emulsion including a discontinuous oil phase comprising: a) a polyorganohydrogensiloxane, b) an amino-modified polyorganosiloxane comprising at least one amino group located at a terminal position and c) a blocked isocyanate.

9 Claims, 1 Drawing Sheet

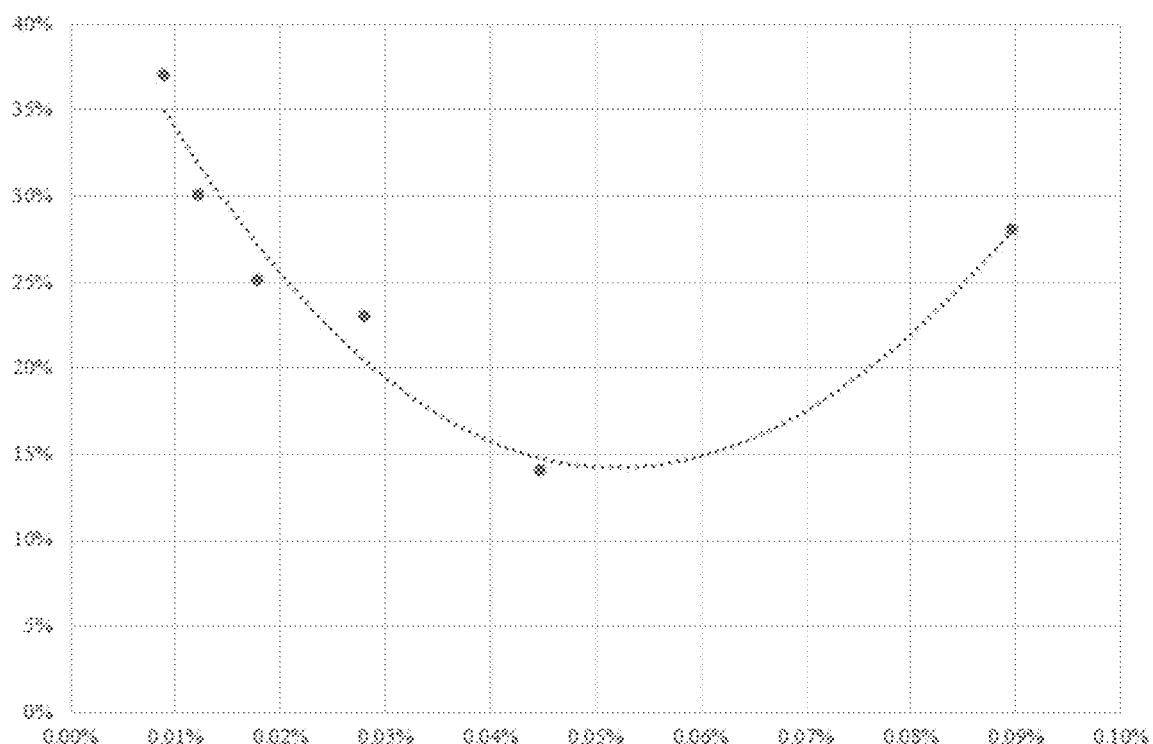

POLYSILOXANE-BASED WATER REPELLANTS FOR TEXTILES

CROSS REFERENCE TO RELATED APPLICATIONS

This application claims the benefit of U.S. Provisional Patent Application Ser. No. 63/210,517 filed on 15 Jun. 2021 under 35 U.S.C. § 119 (e). U.S. Provisional Patent Application Ser. No. 63/210,517 is hereby incorporated by reference.

FIELD

The present invention is directed toward polysiloxane-based compositions useful for treating textiles. The subject compositions and related treatment methods find utility in treating fabrics used in clothing to improve their water repellency.

INTRODUCTION

Textiles such as fabrics used in clothing are commonly treated to improve water repellency. While fluoropolymers have been historically used in such treatments, environmental and health concerns have curtailed their use. A known alternative approach utilizes polysiloxane-based coating compositions. Applicable compositions include one or more types of polysiloxanes including resins (e.g. MQ resins), polydiorganosiloxanes (e.g. polydimethylsiloxanes), polyorganoalkenylsiloxanes (e.g. polyorganosiloxanes including one or more alkenyl groups) and amino-modified polyorganosiloxanes. By way of example, U.S. Pat. No. 8,329,255 describes a composition including an alkoxy-substituted polyorganosiloxane (which may also include amino-functionality) along with a blocked isocyanate crosslinker. US2019/0375897 describes a composition including a silicone resin, an amino-modified polysiloxane and a blocked isocyanate. U.S. Pat. No. 9,777,105 and U.S. Ser. No. 10/040,891 describe the use of amino-modified or alkoxy polyorganosiloxanes along with blocked isocyanates and catalysts.

Another known class of compositions include polyorganohydrogensiloxanes, i.e. polyorganosiloxanes including one or more —SiH groups. For example, U.S. Pat. No. 3,247,281 describes a composition including polyorganohydrogensiloxanes having at least 5 wt % SiH groups along with a catalytic amount of a water soluble aminosilane. U.S. Pat. No. 5,409,620 describes a hydrosilylation-based system including a polyorganohydrogensiloxane, an unsaturated acetate, an organosilicon such as a polyorganoalkenylsiloxane and a metal catalyst. As is known in the art, amino-containing constituents poison platinum catalysts and as such, amino-modified polysiloxanes are excluded from such hydrosilylation-based systems.

While not directed toward water repellency, polyorganosiloxanes are also known for use in the treatment of textiles to improve other properties such as softness, lubricity, durability, fiber shrinkage. For example, U.S. Pat. No. 4,177,176 describes a composition for preventing fiber shrinkage including an amino-modified, hydroxyl or alkoxy terminated polyorganosiloxane and polyorganohydrogensiloxane. JP2002/146680 describes a composition for improving washing resistance and softness of cellulosic fiber cloth while eliminating the "sliminess" associated with the use of silicon resins. The described compositions include an amino-modified polyorganosiloxane and a polyorganohydrogensiloxane along with a urethane prepolymer and blocked isocyanate. The described amino-modified polyorganosiloxanes include amino groups located in a pendant position with respect to the polysiloxane.

Another class of compositions include polyorganoalkenylsiloxanes and polyorganohydrogensiloxanes along with a platinum catalyst which when applied to a substrate, undergo a hydrosilylation reaction to form a crosslinked reaction product. These hydrosilylation-based systems have been described for preparing release and water repellant coatings for paper and PET films (e.g. see US2005/0053793) and for improving adhesion between fabrics and airbags, (e.g. see U.S. Pat. No. 7,534,499 and WO2019/001901).

The industry continues to seek improved water repellant compositions and related textile treatments.

SUMMARY

The inventors of the present invention discovered an unexpected improvement in water repellency associated with the use of treatment compositions based upon polyorganohydrogensiloxanes, amino silicones and blocked isocyanates. More specifically, the inventors discovered that the use of terminal amino silicones in such compositions provides far superior water repellency as compared with the use of corresponding pendant varieties. The present invention includes such compositions along with their preparation and use in treating textiles as well as the resulting textiles. Many embodiments are described.

In one aspect, the present invention includes an aqueous emulsion including an aqueous continuous phase and a discontinuous oil phase, wherein the discontinuous oil phase includes the following constituents: a) 50 to 95 wt % of a polyorganohydrogensiloxane; b) 0.1 to 45 wt % of an amino-modified polyorganosiloxane comprising at least one amino group located at a terminal position; and c) to 30 wt % of a blocked isocyanate. In another aspect, the invention includes the aforementioned emulsion where the discontinuous oil phase includes at least one of the following: i) 0.5 to 1.5 H wt % and ii) 0.004 to 0.2 N wt %. In yet another aspect of the invention, the aforementioned emulsion further includes constituent d): 0.1 to 10 wt % of a polyorganosiloxane including at least one silanol group.

BRIEF DESCRIPTION OF THE DRAWINGS

FIG. 1 is a plot of Bundesmann water pickup after one wash cycle as a function of the amine concentration (N wt %) of the terminal amino silicone used in Example coating emulsions 1-6 provided in Table 2a.

DETAILED DESCRIPTION

As used herein, the term "textile" refers to a flexible material consisting of a network of natural or synthetic fibers. Representative fibers include cotton, flax, hemp, silk, wool, rayon, cellulose, linen, nylon, polypropylene, polyether-polyurea copolymer (e.g. "spandex") and polyester. "Textiles" specifically include non-woven and woven fabrics produced by weaving, knitting, spreading, felting, stitching, crocheting or bonding such fibers. In selected embodiments of the invention, the fabric of interest is that used in the manufacture of clothing (e.g. garments) where softness, water resistance and durability after repeated cleaning (washing, dry cleaning, etc.) are desired.

The subject compositions are preferably provided as an emulsion including a continuous aqueous phase. The water used to prepare the emulsion may be from any source and may optionally be purified, e.g. through filtration, distillation, reverse osmosis techniques, etc. As will be more fully described, the emulsion further comprises a surfactant. The surfactant (alternatively referred to as an "emulsifier") serves to emulsify a discontinuous polysiloxane (oil) phase within the aqueous continuous phase. The discontinuous oil phase of the emulsions preferably comprises from 1 to 10 wt % and more preferably from 2 to 5 wt % of the total weight of the emulsion (i.e. including water, surfactant along with any other additives, solvents, etc.). As will be described below, the subject emulsion may be prepared prior to use by combining previously prepared emulsions of different polysiloxane compositions.

The discontinuous oil phase of the emulsion comprises: a) a polyorganohydrogensiloxane ("SiH polymer"), b) an amino-modified polyorganosiloxane comprising at least one "amino" group located in a terminal position of polyorganosiloxane ("terminal amino silicone") and c) a blocked isocyanate. The discontinuous oil phase may optionally include: d) a polyorganosiloxane including at least one silanol group (—SiOH). In a select class of embodiments, the subject emulsion comprises the following weight percentages of each the aforementioned constituents (wherein constituents a+b+c+d=100%):
  a) 50 to 95 wt %, preferably 60 to 95 wt % and more preferably 60 to 90 wt % of a polyorganohydrogensiloxane;
  b) 0.1 to 45 wt %, preferably 1 to 20 wt % of a terminal amino silicone;
  c) 5 to 30 wt %, preferably 10 to 25 wt % of a blocked isocyanate; and optionally
  d) 0.1 to 10 wt %, preferably 0.5 to 5 wt % of a polyorganosiloxane including at least one silanol group. In sub-class of embodiments, the subject emulsion further comprises at least one and preferably both the following:
    i) 0.5 to 1.5 H wt % (as —SiH) as determined by FTIR and
    ii) 0.004 to 0.2 N wt % and more preferably 0.005 to 0.15 (as "amino") as determined by acid-base titration.

a) Polyorganohydrogensiloxane ("SiH polymer")

The class of applicable polyorganohydrogensiloxanes designated as constituent a) is not particularly limited and includes a wide range of conventional and commercially available materials. Such materials include cyclic, linear and branched polyorganohydrogensiloxanes with linear polymers being preferred. Applicable polymers preferably have a weight average molecular weight (Mw) of 500 to 6000 AMU (Daltons) and more preferably from 1000 to 4500 AMU (Daltons). Applicable polymers may have viscosities from 5 to 50 cSt, more preferably from 10 to 35 cSt measured at 25° C. according to ASTM D2196-05. Different polyorganohydrogensiloxanes may be used in combination, e.g. those having different chemical structures, molecule weights and/or viscosities. The subject polyorganohydrogensiloxanes include at least one, preferably at least two and more preferably at least three —SiH groups which may be located on the polysiloxane backbone at terminal (end) and/or intermediate (pendant) positions. In preferred embodiments, the —SiH groups are predominantly located at pendant positions, i.e. greater than 90 wt % and more preferably greater than 95 wt % and still more preferably greater than 99 wt % of all —SiH groups are located at pendant positions along the polysiloxane chain as determined by 29 Si NMR. Representative polyorganohydrogensiloxanes include those of the general formula:

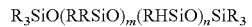

$$R_3SiO(RRSiO)_m(RHSiO)_nSiR_3$$

where m+n=10 to 100, preferably 10 to 60, n is preferably at least 3, m is preferably at least 7, n/(n+m) is preferably greater than 0.375, and "R" may be the same or different and is selected from substituted or unsubstituted monovalent hydrocarbon groups having from 1 to 18 carbon atoms and more preferably from 1 to 8 carbon atoms. Representative hydrocarbon groups include: a) alkyl groups such as: methyl, ethyl, propyl, butyl, pentyl, hexyl, cyclohexyl and heptyl; b) aryl groups such as phenyl, tolyl, xylyl and naphthyl; and c) aralkyl groups such as benzyl and phenethyl; however methyl and phenyl groups are preferred with methyl being most preferred. Applicable commercially available polyorganohydrogensiloxanes include: XIAMETER™ MEM-0075, DOWSIL™ MH 1107 FLUID, XIAMETER™ OFX-5084, SYL-OFF™ 7672 and SYL-OFF™ 7678, all available from The Dow Chemical Company.

b) Amino-Modified Polyorganosiloxane ("Terminal Amino Silicone")

The class of applicable amino-modified polyorganosiloxane designated as constituent b) is not particularly limited and includes a wide range of conventional and commercially available materials so long as at least one amino group is located at a terminal (chain end) position of the polyorganosiloxane. As demonstrated in the Examples below, polyorganosiloxane species including amino groups located at terminal positions of the polyorganosiloxane chain performed far superior to those with amino groups located solely at pendant (intermediate) positions when used in combination with constituents a) and c). And while the subject amino silicones may include amino groups located at both terminal and pendant positions, in a preferred class of embodiments the amino groups are predominately located at terminal positions, i.e. greater than 90 wt % and more preferably greater than 95 wt %, and still more preferably greater than 99 wt % of the amino groups are located at terminal positions as determined by 29 Si NMR. Such polymers include linear and branched structures with linear polymers being preferred. Applicable polymers preferably have a weight average molecular weight (Mw) of 200 to 10,000 AMU (Daltons) and more preferably from 400 to 8000 AMU (Daltons). Applicable polymers preferably have viscosities of from 2 to 200 cSt, more preferably 5 to 150 cSt as measured at 25° C. according to ASTM D2196-05. Different amino-modified polyorganosiloxanes may be used in combination, e.g. those having different chemical structures, molecular weights and/or viscosities. Representative amino-modified polyorganosiloxanes include those of the general formula:

$$XR_2SiO(RRSiO)_qSiR_2X$$

where q is 2 to 200, preferably 25 to 100, R is as defined above, and X is an amino group include including one or more (preferably one to three) primary or secondary amine groups including 1 to 6 carbon atoms. Representative amino groups include those of the general formula:

—R'NR"R"

where R' is a divalent hydrocarbon group (e.g. an alkylene group) having from 2 to 6 carbon atoms and R" is the same or different and is selected from H (hydrogen) or a monovalent hydrocarbon group (e.g. an alkyl group) having from 1 to 6 carbon atoms which may be unsubstituted or substituted with one or more hydrocarbon groups (such that the total carbon atoms in such substituted monovalent hydrocarbon to group is from 1 to 6), primary amine groups and secondary amine groups including a monovalent hydrocarbon group (e.g. an alkyl group) having form 1 to 6 carbon atoms. Representative examples include: —$(CH_2)_3NH_2$, —$(CH_2)_3NHCH_2CH_2NH_2$, —$(CH_2)_4NHCH_2CH_2NH_2$, —$CH_2CH(CH_3)CH_2NHCH_2CH_2NH_2$, —$(CH_2)_3NHCH_2CH_2NHCH_2CH_2NH_2$ and —$(CH_2)_3NH(CH_2)_2CH(CH_2CH_2NH_2)(CH_2)_3NH_2$. Most preferred structures include: —$(CH_2)_3NH_2$ and —$CH_2CHR'''CH_2NHR'''$ where R''' is H or an alkyl group of 1 to 6 carbon atoms. Applicable species are further described in U.S. Pat. No. 9,777,105. Applicable commercially available amino-modified polyorganosiloxanes include: DMS-A15, DMS-A21 and DMS-A31 available from Gelest.

c) Blocked Isocyanate

The class of applicable blocked isocyanates designated as constituent c) is not particularly limited and includes a wide range of conventional and commercially available materials. The term "blocked isocyanate" as used herein refers to a reaction product of an isocyanate and a blocking agent, wherein the blocking agent is removable from the isocyanate under the thermal conditions, i.e. those typically used while treating a textile. Conventional blocking agents include aryl alcohols, alkanone oximes, aryl thiols, organic active hydrogen compounds, sodium bisulfite and hydroxylamine. Preferred blocking agents include alkanone oximes (ketoximes) which can be de-blocked at a relatively low temperature such as used during a typical textile treatment process. For purposes of the present invention, "aromatic" blocked polyisocyanates are preferred. In this context the term "aromatic" means isocyanate compounds with at least one aromatic group, such as materials based on toluene diisocyanate, diphenylmethane 4,4' diisocyanate, diphenylmethane 2,4' diisocyanate, polymethylene-polyphenyl isocyanate, 4,4' methylene bisphenol isocyanate, and derivatives thereof. Suitable isocyanates $A(CNO)_z$ for preparation of the blocked isocyanate are those wherein A is an aromatic compound, and z is 1, 2, 3 or 4. These include isocyanates or derivatives such as toluene diisocyanate, polymethylene-polyphenyl isocyanate, and 4,4' methylene bisphenol isocyanate, and include those aromatic isocyanates sold commercially for this purpose. Typical commercial products include products such as the adduct of toluene diisocyanate and trimethylolpropane (1,1,1 trihydroxymethyl propane) DESMODUR CB-75; (available from Covestro), aromatic isocyanates based on the polymethylenepolyphenylene ester of isocyanic acid, such as MONDUR MR-100 (available from Covestro), and aromatic isocyanates based on polymethylenepolyphenyl isocyanate containing 4,4' methylene bisphenol isocyanate (available from The Dow Chemical Co.). Also available commercially are ready-made blocked aromatic isocyanates such as HYDROPHOBOL DL, PHOBOL XAN Extender (available from Huntsman), DM-6400, MEIKANATE FM-1, MEIKANATE ST, MEIKANATE PRO, MEIKANATE TP-10, MEIKANATE WEB, MEIKANATE ST (available from Meisei Chemical Works, Ltd.). Further background information regarding such isocyanates is provided in US2019/0375897, U.S. Pat. No. 8,392,55 and U.S. Pat. No. 6,451,717.

d) Polyorganosiloxane Including at Least One Silanol Group (—SiOH).

The class of applicable polyorganosiloxanes including at least one silanol group designated as constituent d) is not particularly limited and includes a wide range of conventional and commercially available materials. Such materials include cyclic, linear and branched structures with linear polymers being preferred. Applicable polymers preferably have a weight average molecular weight (Mw) of 200 to 5500 AMU (Daltons). Applicable polymers may have viscosities of from 30 to 100 cSt measured at 25° C. according to ASTM D2196-05. Different polyorganosiloxanes may be used in combination, e.g. those having different chemical structures, molecule weights and/or viscosities. The subject polyorganosiloxanes include at least one, preferably at least two and more preferably at least three silanol (—SiOH) groups which may be located on the polysiloxane backbone at terminal (end) and/or intermediate (pendant) positions. In preferred embodiments, the —SiOH groups are predominantly located at pendant positions, i.e. greater than 90 wt % and more preferably greater than 95 wt % and still more preferably greater than 99 wt % of all —SiOH groups are located at pendant positions along the polysiloxane chain as determined by 29 Si NMR. The subject polyorganosiloxanes preferably have a silanol content of from 1% to 10% weight percent as determined by FTIR. Representative polyorganosiloxanes include those of the general formula:

where t is a number from 2 to 50, Y may be the same or different and is selected from substituted or unsubstituted monovalent hydrocarbon groups having from 1 to 18 carbon atoms and more preferably from 1 to 8 carbon atoms and hydroxyl groups (i.e. a sufficient number of hydroxyl groups to meet the criteria described above), and R may be the same or different and is selected from substituted or unsubstituted monovalent hydrocarbon groups having from 1 to 18 carbon atoms and more preferably from 1 to 8 carbon atoms. Representative hydrocarbon groups include: a) alkyl groups such as: methyl, ethyl, propyl, butyl, pentyl, hexyl, cyclohexyl and heptyl; b) aryl groups such as phenyl, tolyl, xylyl and naphthyl; and c) aralkyl groups such as benzyl and phenethyl; however methyl and phenyl groups are preferred with methyl being most preferred. Applicable commercially available products include: DOWSIL™ Q1-3563 Fluid, and XIAMETER™ PMX-0930 Silanol Fluid all available from The Dow Chemical Company.

Surfactant (Emulsifier)

The class of applicable surfactants for use in preparing the subject emulsions is not particularly limited and includes a wide range of conventional and commercially available materials. The surfactant may be an anionic surfactant, cationic surfactant, nonionic surfactant, amphoteric surfactant, or a mixture thereof with cationic and nonionic surfactants being preferred.

Examples of applicable anionic surfactants include, but are not limited to, alkali metal, amine, or ammonium salts of higher fatty acids, alkylaryl sulphonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl to isethionates, alkyl taurates, alkyl sarcosinates, and mixtures thereof. Further examples of applicable anionic surfactants include carboxylates (sodium 2-(2-hydroxyalkyloxy)

acetate)), amino acid derivatives (N-acylglutamates, N-acylgly-cinates or acylsarcosinates), alkyl sulfates, alkyl ether sulfates and oxyethylenated derivatives thereof, sulfonates, isethionates and N-acylisethionates, taurates and N-acyl N-methyltaurates, sulfosuccinates, alkylsulfoacetates, phosphates and alkyl phosphates, polypeptides, anionic derivatives of alkyl polyglycoside (acyl-D-galactoside uronate), and fatty acid soaps, and mixtures thereof. Commercial examples of applicable anionic surfactants include: STEPANOL® WA-100, CALIMULSE® SLS, POLYSTEP® A-16, POLYSTEP® B-11, POLYSTEP® B-19, TRITON™ QS-15, TRITON™ XN-45S and DOWFAX™ 2A1.

Examples of applicable cationic surfactants include, but are not limited to, alkylamine salts, quaternary ammonium salts, sulphonium salts, and phosphonium salts. Applicable commercial examples of cationic surfactants include: ARQUAD® 16-29, ARQUAD® 18-50, ARLASILK EFA. ATLAS G-265, SYNPROLAM 35X15, VARISOFT® PATC, and VARISOFT® BT-85.

Examples of applicable amphoteric surfactants include, but are not limited to, imidazoline compounds, alkylaminoacid salts, betaines, and mixtures thereof.

Examples of applicable nonionic surfactants include, but are not limited to, condensates of ethylene oxide with long chain fatty alcohols or fatty acids such as a C12-16 alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, and mixtures thereof. Further examples of nonionic surfactants include polyoxy-ethylene fatty alcohols such as polyoxyethylene (23) lauryl ether, polyoxyethylene (4) lauryl ether; ethoxylated alcohols such as ethoxylated trimethylnonanol, C12-C14 secondary alcohol ethoxylates, ethoxylated, C10-Guerbet alcohol, ethoxylated, iso-C13 alcohol; poly(oxyethylene)-poly(oxypropylene)-poly(oxyethylene) tri-block copolymer (also referred to as poloxamers); tetrafunctional poly(oxyethylene)-poly(oxypropylene) block copolymer derived from the sequential addition of propylene oxide and ethylene oxide to ethylene diamine (also referred to as poloxamines), silicone polyethers, polyoxyethylene alkyl ethers, polyoxyethylene alkylphenol ethers, polyoxyethylene lauryl ethers, polyoxyethylene sorbitan monoleates, polyoxyethylene alkyl esters, polyoxy-ethylene sorbitan alkyl esters, polyethylene glycol, polypropylene glycol, diethylene glycol, ethoxylated trimethylnonanols, and polyoxyalkylene glycol modified polysiloxane surfactants, and combinations thereof. Further examples of applicable nonionic surfactants include polyoxyethylene alkyl ethers, polyoxyethylene alkylphenol ethers, polyoxyethylene lauryl ethers, straight-chain, primary alcohol alkoxylates, straight-chain secondary alcohol alkoxylates, alkyl phenol alkoxylates, olefinic alkoxylates, branched chain alkoxylates, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene-substituted silicones (rake or ABn types), silicone alkanolamides, silicone esters, silicone glycosides, and mixtures thereof. Additional examples of applicable nonionic surfactants include dimethicone copolyols, fatty acid esters of polyols, for instance sorbitol or glyceryl mono-, di-, tri- or sesquioleates or stearates, glyceryl or polyethylene glycol laurates; fatty acid esters of polyethylene glycol (polyethylene glycol monostearate or monolaurate); polyoxyethylenated fatty acid esters (stearate or oleate) of sorbitol; polyoxyethylenated alkyl (lauryl, cetyl, stearyl or octyl)ethers. Examples of applicable commercial non-ionic surfactants include: TERGITOL™ 15-S-3, TERGITOL™ 15-S-5, TERGITOL™ 15-S-7, TERGITOL™ 15-S-9, TERGITOL™ 15-S-12, TERGITOL™ 15-S-15, TERGITOL™ 15-S-15, TERGITOL™ 15-S-20, BRIJ™L23, BRIJ™ L4, LUTENSOL® TO3, LUTENSOL® TO5, LUTENSOL® TO7, LUTENSOL® TO10, LUTENSOL® TO12, LUTENSOL® TO15, LUTENSOL® TO20, LUTENSOL® XP30, LUTENSOL® XP100 and LUTENSOL® XP140.

Further examples of applicable amphoteric and zwitterionic surfactants include betaines, N-alkylamidobetaines and derivatives thereof, proteins and derivatives thereof, glycine derivatives, sultaines, alkyl polyaminocarboxylates and alkylamphoacetates, and mixtures thereof.

Additional water-soluble constituents may be added to the aqueous phase including thickeners and preservatives.

In selected embodiments, the subject emulsions are substantially free of one or more of the following constituents including all possible combinations of such constituents:
i) Fluoropolymers;
ii) Organic materials including ethylenically unsaturated groups (e.g. unsaturated acetates, allyl esters, vinyl esters;
iii) Polyorganosiloxanes including ethylenically unsaturated groups (e.g. vinyl);
iv) Platinum-containing catalyst;
v) Resinous materials (e.g. polysiloxane resins and polyurethane resins) and
vi) All metal catalyst.

In this context, the term "substantially free" means less than 1 wt %, preferably less 0.5 wt % and more preferably less than 0.1 wt % and still more preferably less than 0.01 wt %, based upon the total weight of the discontinuous oil phase.

The subject emulsions may be prepared by combining the aforementioned constituents a), b), c) and optionally d) in water along with one or more surfactants with mixing. Mixing may occur using any known technique. Representative mixing devices include homogenizer, sonolator, rotor-stator turbines, colloid mill, microfluidizer, sonicator, blades, helix and combination thereof. Representative methodologies are described in U.S. Pat. Nos. 6,013,682, 8,877, 293 and US2015/0010711. In a preferred embodiment, constituents a) and optional constituent d) are combined in water with surfactant and mixed to form a first emulsion, constituent b) is combined in water with surfactant and mixed to form a second emulsion, constituent c) is combined in water with surfactant and mixed to form a third emulsion. A homogenizer or sonic probe may be used to achieve desired particle size. The first, second, and third emulsions may be stored and subsequently combined prior to use. Alternatively, constituent(s) c) and/or d) may be included in the first emulsion (containing constituent a)), the second emulsion (containing component b)), or a third emulsion.

The particles of the discontinuous oil phase preferably have an average volume particle size "Dv(0.5)" of from 100 to 5000 nm and more preferably from 100 to 2000 nm as determined via laser diffraction using a Malvern 3000 and in accordance with ISO 13320 (2009). As used herein, the term "particles" refers to the oil phase droplets.

Applicable methods of treating textiles with the subject emulsions are not particularly limited and include applying the emulsion to the textile by dipping, padding (e.g. via a roll padder), curtain coating, brush coating, roll coating and spraying methods such as air-atomized spray, air-assisted spray, airless spray, high volume low pressure spray and air-assisted airless spray. The resulting coating is then dried (cured) at elevated temperature from 80 to 180° C. for 1 to 3 minutes. Examples of the drying steps include air drying at room temperature, hot air drying and infrared heating. Typical coating coverages are in the range of 0.5 to 15 grams dry weight per square meter (g/m 2).

Many embodiments of the invention have been described and, in some instances, certain embodiments, selections, ranges, constituents, or other features have been characterized as being "preferred." Such designations of "preferred" features should in no way be interpreted as an essential or critical aspect of the invention. Expressed ranges specifically include designated end points. As used herein, the terms "molecular weight" and "Mw" refer to the weight average molecular weight as measured by gel permeation chromatography (GPC).

EXAMPLES

Unless otherwise indicated, all preparation and testing were conducted at room temperature (RT) at standard pressure (1 atm or 760 mm Hg). The following materials were used in the preparation and testing of aqueous emulsions:

Sample Emulsions were Prepared According to the Following Methodologies:

Emulsions of Ter-Amino1 and Ter-Amino 4:
Amino silicone emulsions were prepared by combining respective amino silicones (4.00 g), BRIJ L23 (0.07 g), BRIJ L4 (0.04 g), and water (35.88 g) in a dental cup and mixed on a Flak-Tek speedmixer (Model 150.1 FZV) at 3500 rpm for 1 minute. Emulsion particle size was then reduced using a sonic probe (Fisherbrand Model 705) at 50% power for 30 seconds.

Emulsion of Ter-Amino2
An amino silicone emulsion was prepared by combining Ter-Amino 2 (20.00 g), BRIJ L23 (1.12 g), BRIJ L4 (0.7 g), acetic acid (10 wt % in water, 0.5 g) and water (27.68 g) in a dental cup and mixed on a Flak-Tek speedmixer (Model 150.1 FZV) at 3500 rpm for 30 seconds. Water (27.68 g) was added to the mixture which was twice passed through a 1-stage homogenizer (APV Systems SPX 2000) at 15000 psi. After homogenization, acetic acid (10 wt %, 2.65 g) was added to 135.95 g of the emulsion.

Emulsions of Pen-Amino1, 2 & 3 and Ter-Amino3
Amino silicone emulsions were prepared by combining the respective amino silicones (4.00 g), BRIJ L23 (0.07 g), BRIJ L4 (0.05 g), and water (35.88 g) in a dental cup and then homogenizing using a sonic probe (Fisherbrand Model 705) at 50% power for 1 minute.

Organohydrogen Siloxane Containing Emulsion:
XIAMETER™ OFX-5084 (60.51 g), BRU L23 (1.12 g), BRU L4 (0.61 g), and water (4.5 g) were added to the mixture and combined on a Flak-Tek speedmixer (Model

TABLE 1

Description of materials used in Examples

| Material Type | Product Name | Chemical Description | Molecular Weight | Source |
|---|---|---|---|---|
| Terminal amino silicone polymer | DMS-A15 (Ter-Amino1) | Aminopropyl terminated polydimethylsiloxanes | 3000 | Gelest |
| Terminal amino silicone polymer | DMS-A21 (Ter-Amino2) | Aminopropyl terminated polydimethylsiloxanes | 5000 | Gelest |
| Terminal amino silicone polymer | DMS-A31 (Ter-Amino4) | Aminopropyl terminated polydimethylsiloxanes | 25000 | Gelest |
| Terminal amino silicone polymer | (Ter-Amino 3) | Aminopropyl terminated polydimethylsiloxanes | 6300 | Ex. VII-n of WO2021/108068 |
| Pendant amino silicone polymer | AMS-132 (Pen-Amino1) | Aminopropylmethylsiloxane-dimethylsiloxane copolymers | 4500-6 k | Gelest |
| Pendant amino silicone polymer | AMS-152 (Pen-Amino2) | Aminopropylmethylsiloxane-dimethylsiloxane copolymers | 7000-9 k | Gelest |
| Pendant amino silicone polymer | AMS-162 (Pen-Amino3) | Aminopropyl methylsiloxane-dimethylsiloxane copolymers | 4000-5 k | Gelest |
| Water soluble amino silane | DOWSIL™ Z-6137 | (3-((2-Aminoethyl) amino) propyl) silanetriol homopolymer | 180 | Dow |
| SiH emulsion | XIAMETER™ MEM-0075 | Polyorganohydrogensiloxane & silanol functional polyorganosiloxane emulsion | 4000 | Dow |
| Polyorgano-hydrogensiloxane | XIAMETER™ OFX-5084 | SiMeH—SiMe$_2$ copolymer | 1300 | Dow |
| Polyorgano-hydrogensiloxane | DOWSIL™ MH 1107 FLUID | Methylhydrogensiloxane in MEM0075 emulsion | 4000 | Dow |
| Surfactant | BRIJ L23 | non-ionic surfactant | | Croda |
| Surfactant | BRIJ L4 | non-ionic surfactant | | Croda |
| Surfactant | ARQUAD 16-29 | cationic surfactant | | AkzoNobel |
| Blocked isocyanate | PHOBOL™ XAN Extender | cationic dispersion of blocked isocyanate | | Huntsman |
| Fabric | PES Fabric | Polyester, No. 4774 075 | | Burlington |

150.1 FZV) at 3500 rpm for 30 seconds. The emulsion was then diluted with water (33.26 g) and twice passed through a 1-stage homogenizer (APV Systems SPX 2000) at 15000 psi. An emulsion containing DOWSIL™ MH 1107 FLUID (60.51 g) was prepared using the same procedure.

1107/PDMS Blend Emulsion:

A solution of 50 cSt 200 Fluid and DOWSIL™ MH 1107 FLUID was prepared by mixing the components in a 1:1 ratio until homogeneous and clear. To this solution (27.99 g) was added ARQUAD 16-29 (2.16 g) and water (4.04 g) in a plastic cup and mixed on a Flak-Tek speedmixer (Model 150.1 FZV) at 3500 rpm for 30 seconds. The emulsion was diluted with water (10.93 g) and mixed via speedmixer at 3500 rpm for seconds.

Coating emulsions were prepared by mixing the aforementioned emulsions along with any additional constituents as indicated in Tables 2a, 2b, 2c and 2d (where all quantities are in grams). The resulting coating emulsions were then applied to standard polyester (PES Style Number 4774 075) fabrics from Burlington by padding followed by curing in a Mathis oven (LTF 81782) at 160° C. for 3 minutes. All coated fabric samples were conditioned at room temperature for at least 24 hours before testing. The coated fabric samples were then allowed to equilibrate at room temperature/humidity for approximately 12 hours. After which, the water repellency was evaluated using ISO 9865 "Textiles—Determination of water repellency of fabrics by the Bundesmann rain-shower test," where samples are fixed into the sample holder and showered with water for 10 minutes. Three parameters can be determined from the test: the penetration of water through the fabric, water absorption by the fabric, and visual appearance (5=best, 1=worst/complete saturation of fabric surface by water). Water absorption is calculated by: (Final Fabric Weight—Initial Fabric Weight)/Initial Fabric Weight. Durability was measured by conducting Bundesmann testing after multiple wash/dry cycles using a standard residential washer and dryer using TIDE® Free detergent. The wash cycle was set at 90° C. followed by a cold-water rinse. The drying cycle was set at high temperature with auto-sense shut-off.

TABLE 2a

Summary of coating emulsion formulations and test results:

| | | Solids conc. (%) | Ex 1 | Ex 2 | Ex 3 | Ex 4 | Ex 5 | Ex 6 |
|---|---|---|---|---|---|---|---|---|
| Amino silicone emulsions | Ter-Amino1 | 10 | | | | | 1 | |
| | Ter-Amino2 | 10 | 0.5 | 1 | 2.5 | 5.01 | | |
| | Ter-Amino3 | 20 | | | | | | 0.5 |
| | Ter-Amino4 | 10 | | | | | | |
| | Pen-Amino1 | 10 | | | | | | |
| | Pen-Amino2 | 10 | | | | | | |
| | Pen-Amino3 | 10 | | | | | | |
| | Water Sol. Amino silane | 23.0 | | | | | | |
| Crosslinker | PhobolXan crosslinker | 30 | 2.09 | 2.09 | 2.09 | 2.09 | 2.09 | 2.09 |
| SiH emulsion | MEM0075 | 58.50 | 4.19 | 4.11 | 3.85 | 3.42 | 4.11 | 4.11 |
| Water | DI water | 100.00 | 93.22 | 92.8 | 91.56 | 89.48 | 92.8 | 93.3 |
| Bundesmann Water Pickup | 0 Wash | | 10% | 16% | 5% | 12% | 6% | 20% |
| | 1 Wash | | 37% | 25% | 14% | 28% | 23% | 30% |
| | 10 Wash | | 37% | 16% | 16% | 17% | | |
| N wt % (N as amino) | | | 0.0090 | 0.0179 | 0.0448 | 0.0896 | 0.0280 | 0.0123 |
| H wt % (as —SiH) | | | 1.18 | 1.16 | 1.08 | 0.96 | 1.16 | 1.16 |

TABLE 2b

Summary of coating emulsion formulations and test results:

| | | Solid conc. (%) | Comp Ex 4 | Comp Ex 5 | Comp Ex 6 | Comp Ex 7 | Comp Ex 8 |
|---|---|---|---|---|---|---|---|
| Amino silicone emulsions | Ter-Amino 1 | 10 | | | | | |
| | Ter-Amino 2 | 10 | | | | | |
| | Ter-Amino 3 | 20 | | | | | |
| | Ter-Amino 4 | 10 | | | | 1 | |
| | Pen-Amino 1 | 10 | 1 | | | | |
| | Pen-Amino 2 | 10 | | 1 | | | |
| | Pen-Amino 3 | 10 | | | 1 | | |

TABLE 2b-continued

Summary of coating emulsion formulations and test results:

|  |  | Solid conc. (%) | Comp Ex 4 | Comp Ex 5 | Comp Ex 6 | Comp Ex 7 | Comp Ex 8 |
|---|---|---|---|---|---|---|---|
|  | Water Soluble Amino silane | 23.0 |  |  |  |  | 0.44 |
| Crosslinker | PhobolXAN crosslinker | 30 | 2.09 | 2.09 | 2.09 | 2.09 | 2.09 |
| SiH emulsion | MEM0075 | 58.50 | 4.11 | 4.11 | 4.11 | 4.11 | 4.11 |
| Water | DI water | 100.00 | 92.8 | 92.8 | 92.8 | 92.8 | 93.36 |
| Bundesmann Water Pickup | 0 Wash |  | 27% | 10% | 8% | 59% | 45% |
|  | 1 Wash |  | 58% | 40% | 46% | 63% | 57% |
|  | 10 Wash |  |  |  |  |  |  |
| N wt % (N as amino) |  |  | 0.0210 | 0.0280 | 0.0700 | 0.0036 | 0.2800 |
| H wt % (as SiH) |  |  | 1.16 | 1.16 | 1.16 | 1.16 | 1.16 |

TABLE 2c

Summary of coating emulsion formulations and test results:

|  |  | Solids Conc (%) | Ex 2 | Ex 7 | Comp Ex 1 | Comp Ex 2 | Comp Ex 3 | Comp Ex 9 |
|---|---|---|---|---|---|---|---|---|
| Amino Silicone emulsion | Ter-Amino2- (2500) | 10 | 1 | 2.5 | 1 | 0 | 25.03 | 0 |
| Crosslinker | PhobolXAN | 30 | 2.09 | 2.09 | 0 | 2.09 | 2.09 | 2.09 |
| SiH emulsion | MH1107/PDMS (50:50) blend | 58.50 |  |  |  |  |  |  |
|  | OFX-5084 | 60.50 |  | 3.72 |  |  |  | 4.14 |
|  | MEM-0075 | 58.50 | 4.11 |  | 4.11 | 4.28 |  |  |
| Water | DI water | 100 | 92.8 | 91.69 | 94.89 | 93.63 | 72.88 | 93.77 |
| Bundesmann Water Pickup | 0 Wash |  | 16% | 36% | 31% | 59% | 56% | 86% |
|  | 1 Wash |  | 25% | 22% | 70% | 64% | 75% | 125% |
|  | 10 Wash |  | 16% |  | 60% | 67% |  |  |
| N wt % (N as amino) |  |  | 0.0179 | 0.0448 | 0.0224 | — | 0.4480 | — |
| H wt % (SiH) |  |  | 1.16 | 0.58 | 1.44 | 1.19 | 0.00 | 0.64 |

TABLE 2d

Summary of coating emulsion formulations and test results:

|  |  | Solids conc. (%) | Ex 8 | Comp Ex 10 | Ex 9 |
|---|---|---|---|---|---|
| Amino Silicone Emulsion | Ter-Amino2- (2500) | 10 | 1 | 0 | 1 |
| Crosslinker | Phobol XAN | 30 | 2.09 | 2.09 | 2.09 |
| SiH Emulsion | MH 1107 | 60.50 |  |  | 3.85 |
|  | MEM-0075 | 58.50 | 4.11 | 4.28 |  |
| Additive | Di-propylene glycol | 42 | 1.25 | 1.25 | 0 |
| Water | DI Water | 100 | 91.55 | 92.38 | 93.06 |
| Bundesmann Water Pickup | 0 Wash |  | 5% | 38% | 14% |
|  | 1 Wash |  | 4% | 48% | 21% |
|  | 10 Wash |  | 6% | 65% | 23% |
| Calculated N wt % (N as amino) |  |  | 0.02 | 0.00 | 0.04 |
| Calculated H wt % (as SiH) |  |  | 1.16 | 1.20 | 1.15 |

The invention claimed is:

1. An aqueous emulsion comprising an aqueous continuous phase and a discontinuous oil phase, wherein the discontinuous oil phase comprises the following constituents:
   a) 50 to 95 wt % of a polyorganohydrogensiloxane;
   b) 0.1 to 45 wt % of an amino-modified polyorganosiloxane comprising at least one amino group located at a terminal position; and
   c) 5 to 30 wt % of a blocked isocyanate.

2. The emulsion of claim 1 wherein the discontinuous oil phase comprises:
   i) 0.5 to 1.5 H wt % as SiH and
   ii) 0.004 to 0.2 N wt %.

3. The emulsion of claim 1 wherein the discontinuous oil phase further comprises constituent d): 0.1 to 10 wt % of a polyorganosiloxane including at least one silanol group.

4. The emulsion of claim 1 wherein constituent a) has a weight average molecular weight (Mw) of 500 to 6000 AMU and constituent b) has a weight average molecular weight (Mw) of 200 to 10,000 AMU.

5. The emulsion of claim 1 wherein constituent b) is represented by at least one of the following formulae: i) $(CH_2)_3NH_2$ and ii) $CH_2CHR'''CH_2NHR'''$ where $R'''$ is either H or an alkyl group of 1 to 6 carbon atoms.

6. The emulsion of claim 1 wherein the discontinuous oil phase comprises the following constituents:
   a) 60 to 90 wt % of a polyorganohydrogensiloxane;
   b) 1 to 20 wt % of an amino-modified polyorganosiloxane comprising at least one amino group located at a terminal position; and
   c) 10 to 25 wt % of a blocked isocyanate.

7. The emulsion of claim 1 further characterized by being substantially free of organic materials comprising ethylenically unsaturated groups.

8. The emulsion of claim 1 further characterized by being substantially free of platinum-containing catalyst.

9. The emulsion of claim 1 further characterized by being substantially free of resinous materials.

* * * * *